Dec. 3, 1940.　　　K. H. KRAUSE　　　2,223,624
GRAIN DRILL POWER LIFT
Filed July 28, 1939　　　3 Sheets-Sheet 1

INVENTOR
KARL H. KRAUSE
BY　*A.S.Krok*
ATTORNEY

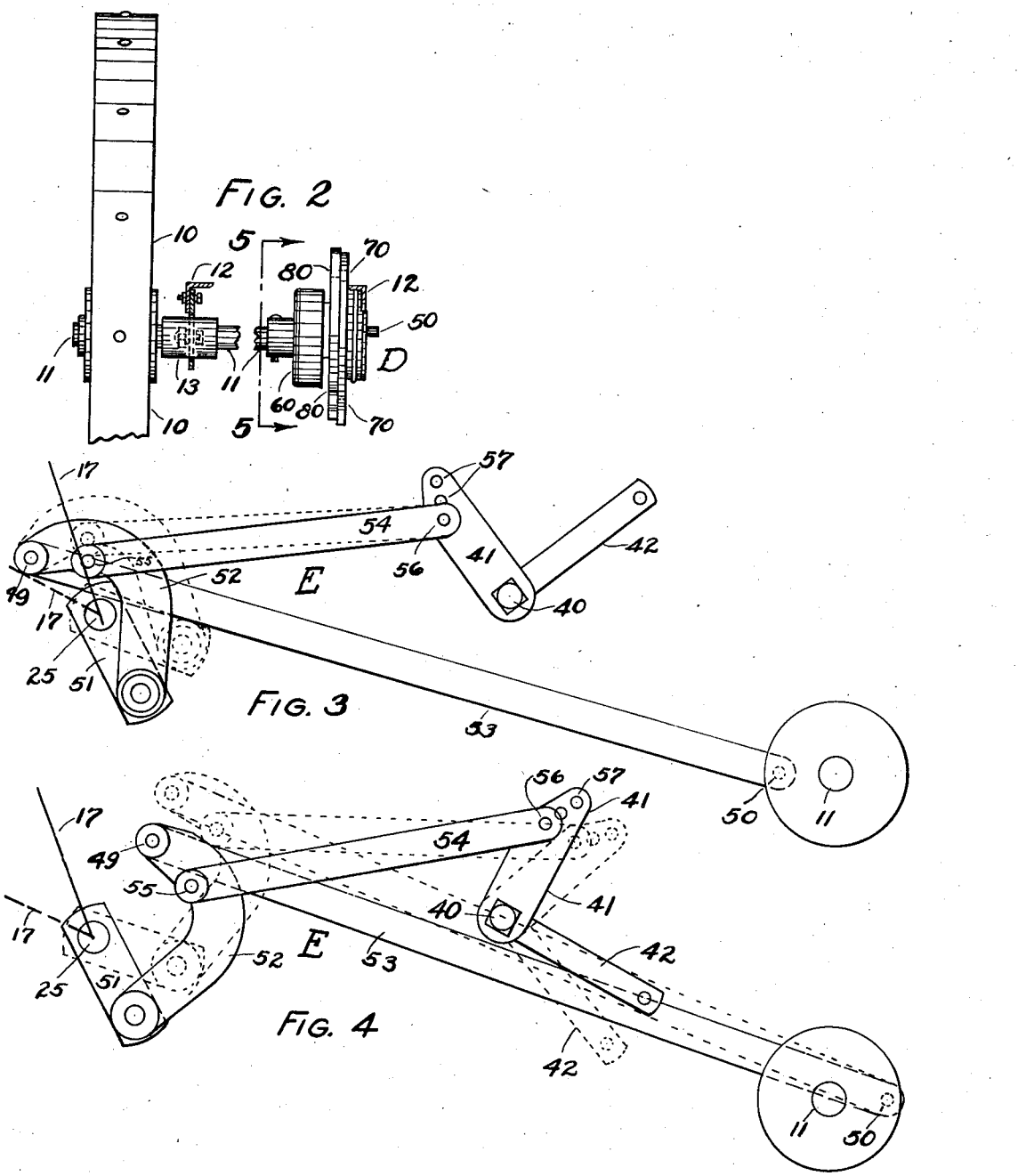

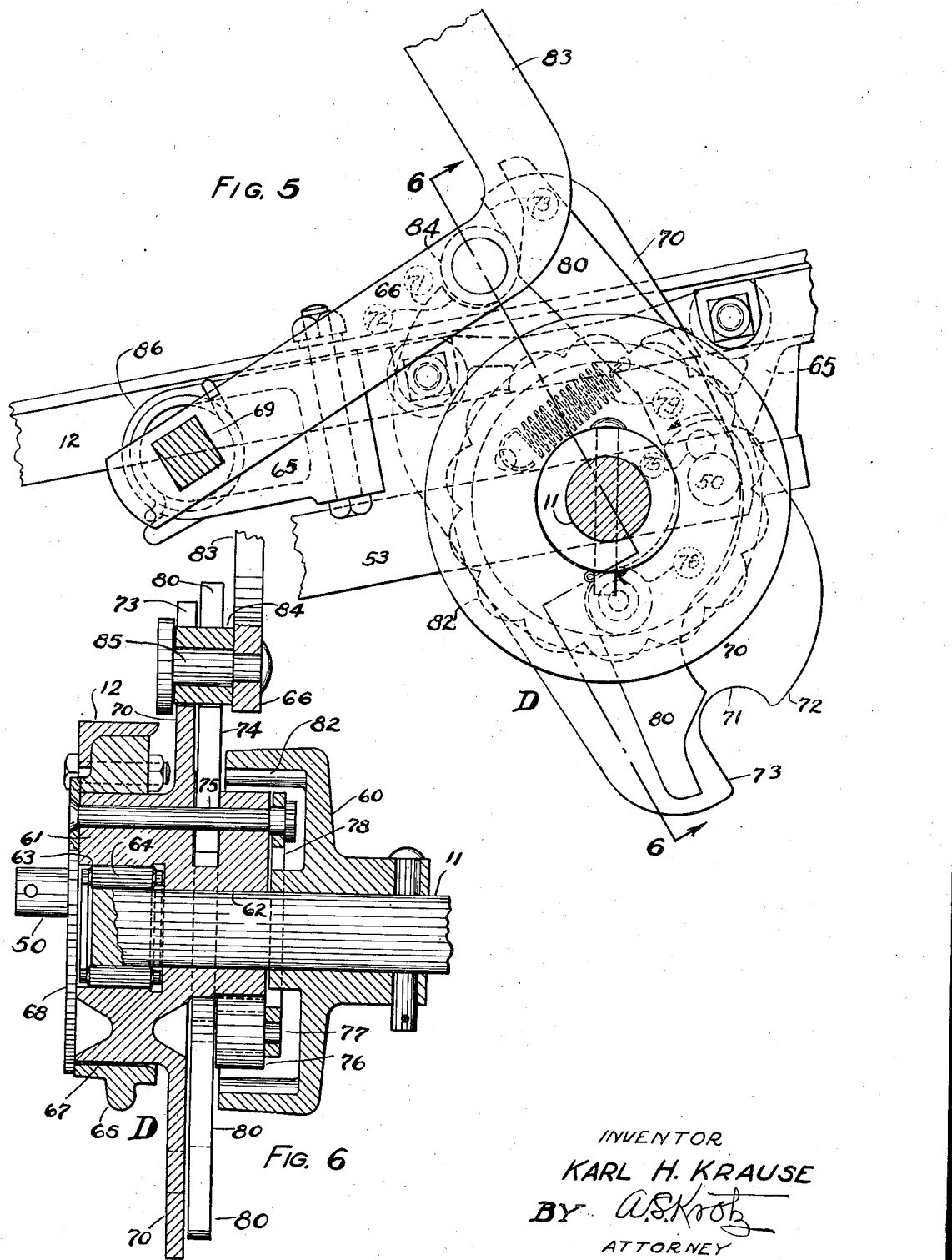

Patented Dec. 3, 1940

2,223,624

UNITED STATES PATENT OFFICE 2,223,624

GRAIN DRILL POWER LIFT

Karl H. Krause, York, Ontario, Canada, assignor to Massey-Harris Company Ltd., Toronto, Ontario, Canada, a corporation of Canada Application July 28, 1939, Serial No. 286,957

5 Claims. (Cl. 97—244)

In devices of the class having a fixed power lift movement there is necessarily limited room under the frame for the ground engaging means or furrow openers when lifted especially during shallow planting. The openers are necessarily spring held into the ground. For deep planting or when considerable spring pressure is needed to hold the openers into the ground they will scarcely clear the ground when lifted.

The present invention relates to power lifting and depth regulating devices wherein there is provided a lever having means associated with the power lifting clutch whereby the lever adjustments influence the ground engaging means when in their down or operating position only.

My invention also relates to a novel clutch mechanism which cooperates with the depth changing mechanism to provide a device which is simple, reliable, durable and efficient.

To these and other useful ends my invention consists of parts, combinations of parts, or their equivalents, and mode of operation, as hereinafter set forth and claimed and shown in the accompanying drawings in which:

Fig. 2 is a fractional rear view of my invention illustrating the clutch mechanism and wheel axle connection to the frame members.

Fig. 3 is a side view illustrating the lever, clutch crank and link mechanism in position when the ground working device is lifted.

Fig. 4 is a side view illustrating the lever, clutch crank and links in position when the ground working device is in operating position.

Fig. 5 is an end view of the clutch mechanism taken on line 5—5 of Figure 2.

Fig. 6 is a transverse sectional view of the clutch mechanism taken on lines 6—6 of Figure 5.

Figure 1:
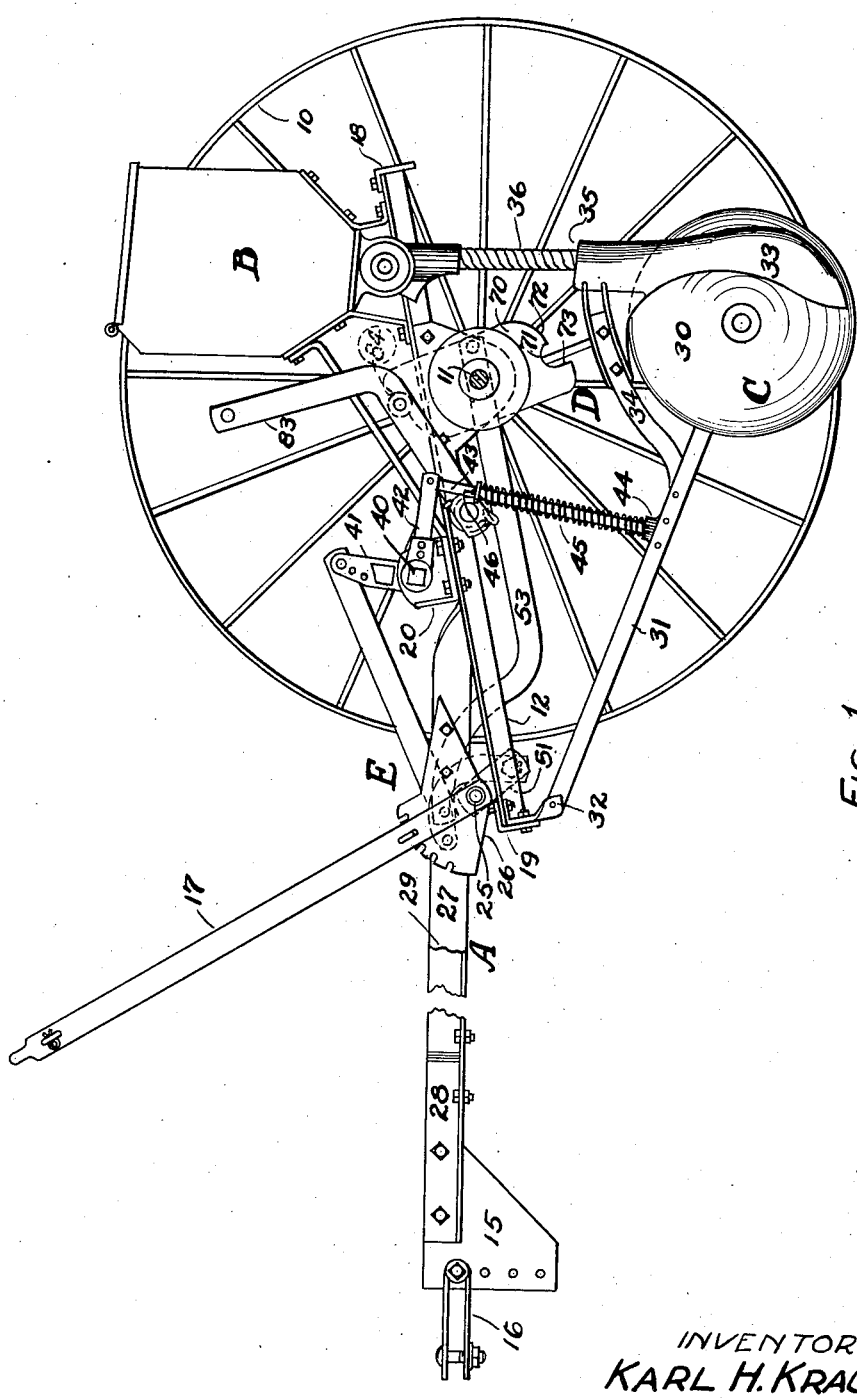
Fig. 1 is a side elevation of a grain drill equipped with my invention, the near wheel and a fraction of the frame being removed so as to more clearly illustrate my invention.

As thus illustrated, the main frame of my device is designated in its entirety by reference character A. The seed box is designated in its entirety by reference character B. The ground working device or furrow openers are designated in their entirety by reference character C. The power lifting clutch in its entirety is designated by reference character D. The link connections between the clutch, lever and the ground engaging device are in their entirety, designated by reference character E.

In Figure 1 I illustrate in part, a conventional seeder wherein the grain box B is mounted on the rear of frame A, the frame being supported by means of ground wheels 10 which are mounted on the outer end of stub axles 11 (see Figure 2). The outer ends of these stub axles are rotatably mounted on the end frame member 12 by means of bearing blocks 13. The inner ends of the axles are rotatably mounted on other frame members 12 through the clutch mechanism as will hereinafter appear.

I have, as a matter of convenience, illustrated member A as having a forwardly extending centrally positioned extension having a hitch bracket 15 and a vertically adjustable clevis 16 hingedly secured thereto which is adapted to be attached to the draw bar of a tractor. A depth regulating lever 17 is pivotally mounted on the front of the main frame as will hereinafter appear.

The frame proper comprises a number of spaced angle bars 12, the rear ends being preferably secured together by means of an angle bar 18. The front ends of bars 12 are secured together by means of an angle bar 19. An angle bar 20 is positioned as illustrated in Figure 1 and secured to members 12 thus providing a substantial main frame having a forwardly extending hitch portion as already outlined.

Lever 17 is pivotally mounted on frame A as at 25 and having a sector 26 which is preferably secured to the center bar 27 of the forwardly extending frame portion. It will be noted that the outer or near portion 28 of the forwardly extending hitch portion of the frame is cut-away as at 29 so as to more clearly illustrate the lever and its connecting parts. Sector 26 is shown as being secured to member 27. It may, however, be secured to any other portion of the frame A.

The ground engaging means in the present instance are furrow opening discs 30. These discs as is the custom in devices of the kind are usually spaced about 8″ apart each being provided with a beam 31 which is mounted on transversely spaced hinges to member 19 as at 32 so the ground engaging means may be raised and lowered as will hereinafter appear.

Ground engaging means C is provided with a seed directing shield or boot 33 which is rigidly secured to member 31 by means of arm 34 and having an opening in its top as at 35 for the reception of a flexible seed tube 36, the seed tube having an operating connection to the seed metering devices which are too well known to require further description.

A shaft 40 is rotatably mounted on member 20 at spaced intervals for the length of the main frame and is provided with an upwardly extending arm 41 and rearwardly extending arms 42 one for each beam 31 which are operatively connected to these beams by means of a rod 43, the rod being slidably mounted in brackets 44.

A compression spring 45 is mounted on each rod 43 and held between pins 46 and brackets 44. A cotter pin (not shown) is positioned in the lower end of rod 43 which limits the downward movement of member 44 thus the various positions of members 30 will be fixed by the position of lever 41 and if lever 41 is moved far enough rearwardly, members 30 will be yieldingly held into the ground. The position of arm 41 is controlled by means of lever 17 and the clutch mechanism as will hereinafter appear.

I will now describe the connections between lever 17, arm 41 and the power lift clutch (see Figures 3 and 4). A downwardly extending arm 51 is operatively connected to lever 17 and on the lower end of this arm I pivotally mount a link 52. This link is shaped as illustrated so as to make the necessary movements possible without interfering with shaft 25 and its supports.

At the upper end of link 52 I pivotally mount a link 53 as at 49 the link extending to and being pivotally mounted on crank pin 50. Pin 50 as will hereinafter appear is adapted to be moved to its positions alternately one of which is shown in Figure 3 and the other in Figure 4.

I pivotally mount a third link 54 at its forward end to link 52 as at 55, the rearward end of which is pivotally secured to lever 41 as at 56. This connection, however, may be made in any one of the three orifices shown in arm 41 for purposes which will hereinafter appear. When lever 17 is in the position illustrated in Figure 3 by solid line and pin 50 is in its forward position as shown, arm 42 will be in its upper position or in the position adapted to hold furrow openers 30 out of the ground.

In Figure 3 I illustrate lever 17 in its furthest forward position by means of a dotted line and the other connecting parts are also shown by dotted lines when the lever is in this position. Thus it will be seen that when lever 17 is moved to its forward position, arm 41 is not materially changed in its position because of the action of links 52, 53 and 54.

A series of spaced orifices 57 are provided in the free end of arm 41 which are positioned so the rear end of link 54 may be moved to either of these orifices without changing the lifting position of the ground engaging means when they are in their lifted position as will be clearly understood by scrutinizing Figure 3. However, it will be seen that these orifices 57 may be used to vary the depth position of the furrow openers relative to the position of lever 17.

Referring now to Figure 4 which illustrates the crank pin 50 in its rear position or the position required to move the furrow openers to their operating position. It will be seen that when depth lever 17 is in the position shown by solid lines, arms 42 will be in the position shown by solid lines and that when lever 17 is moved to the position shown by dotted line, arms 42 will also be in the position illustrated by dotted lines. Thus the furrow openers, when in the ground, may be raised and lowered by means of lever 17. This lever movement however, will not influence the furrow openers when in their raised position as clearly illustrated in Figure 3.

Referring now to Figures 5 and 6. Axle 11 has secured thereto and a distance from its end, an internal gear 60. The internal teeth in this gear are shaped as illustrated by dotted lines in Figure 5. I rotatably mount a hub 61 on the end of axle 11 by means of an opening 62 which fits freely over the shaft. A larger opening 63 is provided into which is mounted a roller bearing 64. The intention is to carry all of the axle weight on this roller bearing in the following manner:

A bracket 65 is secured to frame member 12. This bracket extends forward a distance so as to provide a pivotal support for the front end of a manually operated lever 66 as at 69. Bracket 65 is adapted to rotatably support member 61 in opening 67.

I provide a disc or plate 68 which is secured to member 61 and being large enough to form an end thrust against member 65 so as to position member 61 relative to its support. Member 61 may be classed the intermittently operating part of the clutch and member 60 the constantly rotating part of the clutch.

Means are provided whereby member 61 will be caused to turn one half revolution every time lever 66 is operated as follows:

Member 61 is provided with oppositely extending members 70—70, each having depressions 71 formed on their fronts by means of guides 72 and on the rear by raised portions 73. An arm 74 is pivotally mounted to member 61 as at 75. This arm carries a roller 76 through the medium of a pin 77. The outer end of pin 77 is anchored to member 75 by means of a link 78 as illustrated.

A spring 79 (see dotted lines in Figure 5) operates to pull member 74 in the direction indicated by dotted curvilinear arrow. Member 74 is provided on opposite ends with projections 80 which are caused to fill the space 71 by action of spring 79 at which time roller 76 is yieldingly held into pockets 82 of member 60. Thus when the clutch operates, member 61 will be carried around with member 60.

Lever 66 is provided with an upwardly extending projection 83 having secured to its end a rope which extends to the operator of the tractor.

A sleeve 84 is rotatably mounted on lever 66 by means of bolt 85. This sleeve is made of a diameter which will loosely fit into depression 71. Members 80 are made long enough so when roller 84 is caused to approach depression 71, it will contact one of members 80 and carry it back to the position illustrated in Figure 5 thus to disengage roller 76 from pockets 82 and hold the intermediate part of the clutch into position after roller 84 finds lodgement into depression 71 which position is insured by the action of a spring 86.

When the clutch pin 50 is in the position illustrated by dotted lines in Figure 5 or as illustrated in Figure 4, the furrow openers will be down or in operating position and the linkage will be in the position illustrated in this figure depending upon the position of lever 17.

Every time lever 83 is pulled far enough to disengage the clutch mechanism, roller 76 will be caused to contact members 82 and member 61 will be carried around one half turn and roller 84 will again contact one of members 80 and cause roller 76 to be again disengaged so the clutch mechanism and links will be held in either one of the positions illustrated in Figures 3 and 4.

Thus it will be seen that I have provided convenient means for engaging and disengaging a half turn clutch mechanism which is positioned on the inner end of one of the stub axles, the axle being rotatably mounted on roller bearings and the intermediate part of the clutch being rotatably mounted in the bearing block which is supported by a frame member.

Thus it will be seen that the clutch and lever connections are simple and particularly adapted for cooperation with the other elements to accomplish the purposes for which the device was devised.

Clearly, for very large seeders, I may equip the other end of the seeder with a clutch, in which case, shaft 40 would be made in two parts, each being supplied with a lever regulating device, as shown in Figure 1.

Clearly many minor detail changes may be made without departing from the spirit and scope of the present invention as recited in the appended claims.

Having thus shown and described my invention, I claim:

1. A device of the class described, comprising a wheeled carry frame, the wheels being mounted on the outer ends of stub axles, a half turn clutch operatively connected to the inner end of one of said axles, ground engaging means mounted for vertical movement on said frame, a depth regulating lever mounted on said frame having operating connections to said ground engaging means and said clutch, said operating connections comprising a depending arm operatively secured to said lever, a relatively short link pivotally mounted at its lower end to the lower end of said arm, the other end of said short link having independent link connections to said clutch and ground engaging means, said three links being positioned and shaped whereby the movement of said lever will change the depth of the ground engaging means when in their operating position and whereby when the ground engaging means are in their lifted or inoperative position a movement of said lever will not materially change their position.

2. A device of the class described, comprising a frame having two transversely spaced carrying wheels mounted on the outer ends of stub axles, ground engaging means mounted for vertical movement on said frame, a depth lever mounted on said frame and having operatively secured thereto a depending arm, a vertically extending link hingedly mounted at its lower end to the lower end of said arm and having at its upper end an operating connection to said ground engaging means, a half turn clutch operatively mounted on the inner end of one of said axles and having a link connection to the upper end of said first link to thereby act to raise and lower all or certain of said ground engaging means by swinging said link on its connection to said arm, the shape and position of said arm and links being adapted to permit said lever to change the position of said ground engaging means only when in their ground engaging position.

3. A device as recited in claim 2 including: said clutch comprising an internal gear being secured to its axle a distance from the inner end thereof and an intermittently operating member rotatably mounted on the end of said axle adjacent said gear member and being rotatably mounted on said frame to thereby act as a bearing support for the end of the axle, a plate secured to the inner end of said intermittently operating member being adapted to act as an end thrust against the frame bearing, a crank secured to said intermittent member and extending through said plate to which said last link is rotatably mounted, means mounted on said intermittent member adapted to engage and disengage the teeth of said internal gear, and manually operated means adapted to control the operation of said engaging means.

4. A device of the class described, comprising a two wheeled carrying frame having ground engaging means mounted thereon for vertical movement, a half turn clutch operatively connected to one of said wheels, a depth regulating lever having pivotally secured thereto a relatively short link, separate link connections between the free end of said first link and said ground engaging means and said clutch, each said three links being positioned and shaped whereby said clutch may be operated to raise and lower said ground engaging means, and whereby a movement of said lever will act to raise and lower the ground engaging means when in their operating position but will not materially change the position of said ground engaging means when in their inoperating position.

5. A device of the class described, comprising a manually operated lever having pivotally mounted thereon a relatively short link, a relatively long link pivotally connected at one end to said short link remote from said first pivot and having an operating connection at its other end to the device to be raised or lowered, a half turn clutch having a link connection to said first link and adjacent said second link connection, said second link at its remote end being substantially at right angles to the movement of its other end which is brought about by the lever movement when said device to be raised and lowered is in its lifted position and whereby the movement of said lever cooperating with said third link will act to regulate the vertical position of said device when in its lower position.

KARL H. KRAUSE.